US010731303B2

(12) United States Patent
Lingle et al.

(10) Patent No.: US 10,731,303 B2
(45) Date of Patent: Aug. 4, 2020

(54) GROUND REINFORCING STRUCTURE AND RELATED METHOD

(71) Applicant: Brentwood Industries, Inc., Reading, PA (US)

(72) Inventors: Luke Lingle, Reading, PA (US); Frank M. Kulick, III, Leesport, PA (US)

(73) Assignee: Brentwood Industries, Inc., Reading, PA (US)

( * ) Notice: Subject to any disclaimer, the term of this patent is extended or adjusted under 35 U.S.C. 154(b) by 0 days.

(21) Appl. No.: 16/153,057

(22) Filed: Oct. 5, 2018

(65) Prior Publication Data

US 2020/0109523 A1   Apr. 9, 2020

(51) Int. Cl.
*E01C 5/00* (2006.01)
*E01C 5/20* (2006.01)
*E01C 11/02* (2006.01)

(52) U.S. Cl.
CPC ............... *E01C 5/20* (2013.01); *E01C 11/02* (2013.01)

(58) Field of Classification Search
CPC .................................. E01C 5/20; E01C 11/02
USPC ........ 404/27–46, 72, 75; 405/16–36, 43–50; 428/44, 53, 180
See application file for complete search history.

(56) References Cited

U.S. PATENT DOCUMENTS

| 1,765,652 | A | 6/1930 | Burgess |
| 1,914,107 | A | 6/1933 | Burgess |
| 4,440,818 | A * | 4/1984 | Buchan .................. E01C 5/005 428/117 |
| 4,621,942 | A | 11/1986 | Hill |
| 4,671,699 | A | 6/1987 | Roach |
| 5,250,340 | A | 10/1993 | Bohnhoff |
| 5,409,325 | A | 4/1995 | Wu |

(Continued)

FOREIGN PATENT DOCUMENTS

| AU | 2017100245 A4 | 3/2017 |
| CA | 2226067 A1 | 6/1999 |

(Continued)

OTHER PUBLICATIONS

Int'l Search Report and Written Opinion dated Dec. 21, 2018 in Int'l Application No. PCT/US2018/55605.

*Primary Examiner* — Raymond W Addie
(74) *Attorney, Agent, or Firm* — Panitch Schwarze Belisario & Nadel LLP (57) ABSTRACT

A ground reinforcing structure includes first and second reinforcement sheets. The first reinforcement sheet has a first plurality of structural support rows and a connector row. The first plurality of structural support rows includes a first support row and a second support row. The connector row includes a first connector and a second connector. The second reinforcement sheet has a second plurality of structural support rows. The second plurality of structural support rows includes an end structural support row that has a first structural support connector and a second structural support connector. The first and second structural support connectors are secured by a first structural rib. The first connector is nested within the first structural support connector and the second connector is nested within the second structural support connector to secure the first reinforcement sheet to the second reinforcement sheet.

22 Claims, 8 Drawing Sheets

(56) References Cited

U.S. PATENT DOCUMENTS

| | | | | |
|---|---|---|---|---|
| 5,848,856 A * | 12/1998 | Bohnhoff | ................ | E02B 11/00 |
| | | | | 405/36 |
| 5,993,107 A | 11/1999 | Bauer | | |
| D442,704 S | 5/2001 | Lee | | |
| 6,428,870 B1 * | 8/2002 | Bohnhoff | ................ | E02B 11/00 |
| | | | | 405/50 |
| 7,160,052 B2 | 1/2007 | Weiss, Jr. et al. | | |
| 7,210,876 B2 | 5/2007 | Moralez et al. | | |
| D571,024 S * | 6/2008 | Lee | ............................. | D25/118 |
| 7,419,327 B2 | 9/2008 | Weiss, Jr. | | |
| 7,544,010 B2 | 6/2009 | Restrepo et al. | | |
| 7,571,572 B2 * | 8/2009 | Moller, Jr. | ................ | E01C 5/20 |
| | | | | 404/41 |
| 7,815,395 B1 | 10/2010 | Blackwood | | |
| 7,822,291 B2 | 10/2010 | Guetter et al. | | |
| 7,918,623 B2 | 4/2011 | Lacroix et al. | | |
| 7,938,597 B2 | 5/2011 | Blackwood | | |
| 7,950,191 B2 | 5/2011 | Brouwers | | |
| 7,958,681 B2 | 6/2011 | Moller, Jr. | | |
| 8,006,443 B2 | 8/2011 | Fuccella et al. | | |
| 8,128,311 B2 * | 3/2012 | Son | ........................ | A63C 19/04 |
| | | | | 403/326 |
| 8,142,101 B2 | 3/2012 | Kaul | | |
| 8,266,857 B2 | 9/2012 | David | | |
| 8,282,310 B2 | 10/2012 | White | | |
| 8,398,332 B2 | 3/2013 | Allen | | |
| 8,403,592 B2 * | 3/2013 | Son | ........................ | A01G 20/00 |
| | | | | 404/35 |
| 8,459,903 B2 | 6/2013 | Senf et al. | | |
| D685,924 S | 7/2013 | Lee et al. | | |
| D696,874 S | 1/2014 | Huss et al. | | |
| 8,696,241 B2 * | 4/2014 | Lee | ........................ | E01C 13/083 |
| | | | | 405/39 |
| 8,734,049 B1 | 5/2014 | Stiles | | |
| 8,827,597 B2 | 9/2014 | Bach et al. | | |
| D721,824 S | 1/2015 | Bach | | |
| 8,967,918 B2 | 3/2015 | Schneider et al. | | |
| 8,979,420 B2 | 3/2015 | Rusch et al. | | |
| 9,161,496 B2 * | 10/2015 | Holland, Jr. | ............ | A01G 20/20 |
| 9,206,559 B2 | 12/2015 | Bach et al. | | |
| D750,280 S | 2/2016 | Bach | | |
| D771,837 S | 11/2016 | Kstacio | | |
| D782,291 S | 3/2017 | Bach | | |
| 9,670,624 B1 * | 6/2017 | Stiles | ........................ | E01F 9/553 |
| D806,272 S | 12/2017 | Bach | | |
| 9,909,264 B1 | 3/2018 | Stiles | | |
| 9,909,266 B1 | 3/2018 | Stiles | | |
| 10,358,775 B2 * | 7/2019 | Son | ........................ | A01G 9/033 |
| 10,415,260 B2 * | 9/2019 | Gooden | ................ | E04G 11/48 |
| 2007/0274776 A1 | 11/2007 | Urriola | | |
| 2007/0284302 A1 | 12/2007 | Blackwood | | |
| 2008/0279626 A1 | 11/2008 | Altmann et al. | | |
| 2009/0274513 A1 | 11/2009 | Scheiwiller | | |
| 2009/0274514 A1 | 11/2009 | Scheiwiller | | |
| 2009/0297267 A1 | 12/2009 | Glynn | | |
| 2010/0107522 A1 | 5/2010 | Gettig et al. | | |
| 2013/0140229 A1 | 6/2013 | Allen et al. | | |
| 2013/0276399 A1 * | 10/2013 | Rapaz | ........................ | E04C 2/34 |
| | | | | 52/592.1 |
| 2014/0270945 A1 | 9/2014 | Bach et al. | | |
| 2015/0117949 A1 | 4/2015 | Battersby | | |
| 2017/0181390 A1 | 6/2017 | Harris, Sr. | | |
| 2017/0328015 A1 | 11/2017 | Barth et al. | | |
| 2018/0051425 A1 | 2/2018 | Stiles | | |

FOREIGN PATENT DOCUMENTS

| | | |
|---|---|---|
| CA | 142629 S | 7/2012 |
| CA | 2676141 C | 10/2014 |
| CL | 2015002544 A1 | 7/2016 |
| CN | 105113360 A | 12/2015 |
| EA | 3038543300001 S | 6/2017 |
| EP | 0966571 A1 | 12/1999 |
| EP | 2309839 A1 | 4/2011 |
| EP | 3175041 A1 | 6/2017 |
| GB | 1512264 A | 5/1978 |
| IL | 239995 A | 6/2018 |
| NZ | 422943 S | 7/2017 |
| RU | 2473729 C1 | 1/2013 |
| VN | 46192 A | 3/2016 |
| WO | 95009277 A1 | 4/1995 |
| WO | 2016015142 A1 | 2/2016 |
| WO | 2018044379 A1 | 3/2018 |

* cited by examiner

GROUND REINFORCING STRUCTURE AND RELATED METHOD

BACKGROUND OF THE INVENTION

Permeable pavers are typically utilized to support vehicles on a ground surface as an alternative to pavements or other surfaces that are generally impermeable. The permeable pavers are typically constructed of rigid sheets comprised of a grid structure that facilitates filling with a masonry material, such as crushed stone, permits permeation of water through the grid into underlying soil and supports vehicles, such as in a driveway or parking lot. The pavers are typically rigidly constructed so that they remain in a rigid and flat configuration during transport, installation and use. The pavers are generally difficult and cumbersome to arrange and install, particularly when multiple sheets must be interlocked to form a final permeable paver assembly in a relatively large parking area or along a significant driveway. Field assembly of panels on site is costly due to construction labor and known rolled materials are cumbersome to align. It would be desirable to design develop and deploy a permeable paver or ground reinforcing structure that is easy to install, which would be a great advantage to the installers or contractors.

One of the many struggles in assembling the permeable paver sheets are the connections between the sheets. Nearly all of these connections are a derivation of a simple snap connector that requires a worker to assemble each connection by hand. This can be a lengthy process for the hundreds of potential connections a permeable paver system may have.

A major structural component of a permeable paver is how well the paver carries load across a single mat. U.S. Pat. No. 7,210,876 ("'876 patent") utilizes tubular hexagonal-shaped cell members that are diagonally offset but share a common sidewall with an adjacent cell member. These offset cell members are designed from a single tubular shape that is offset multiple times which makes up rows of connected cell members with common sidewalls. As a result of this row design, relatively large voids are created between the rows where vehicle tires are unsupported when rolling over the assembled pavers. These voids in the structural supports can cause rutting and road noise when the tires of vehicles roll over the assembled paver sheets.

Another issue in the permeable paver market is how the pavers are designed laterally or at edges of the assembled paver sheets. Known permeable pavers, such as the permeable pavers described in the '876 patent, end with a flat wall sidewall that defines a straight line at its edge and may butt up against another sheet or mat at another edge. These straight or sheer edges can cause major rutting to the paver assembly, damage to the edges of the sheets and may structurally damage connections between the sheets, as large separating forces are created at connections between the sheets. When a vehicle drives on the line between two sheets, a bending moment is generated causing the two sheets to bend up as the edges are pushed down. These are the weaker sections of the sheets because they have difficulty supporting a load well enough on the edges, as the sheets are strongest in the center (snow shoe effect). A tire rolling down the edge of these straight-edged prior art sheets applies load directly to the single sheet at the edge and any load transfer to an adjacent sheet must be carried to the adjacent sheet exclusively by connections between the sheets. The known connections typically have difficulty carrying and transferring these loads.

It would be desirable to design, develop, construct and deploy a permeable paver system, including structural reinforcement sheets or mats that are relatively easily transported and installed. It would be desirable for the paver sheets or mats to include a connection system that is relatively simple for operators to align and engage. It is also desirable for the paver system to support the travel of vehicles over the connected sheets, as well as along edges of the connected sheets without significantly damaging to moving the assembled sheets. It would further be desirable for the connection of paver sheets of the permeable paver system to facilitate easy installation into the form of substantially installed pavement. In contrast, known permeable paver products require closer assembly or individual assembly of connections, typically by hand to align and connect sheets/grids.

BRIEF SUMMARY OF THE INVENTION

Briefly stated, a preferred embodiment of the present invention is directed to a ground reinforcing structure for positioning on a ground surface and containing loose masonry materials. The ground reinforcing structure includes a first reinforcement sheet having a first plurality of structural support rows and a second reinforcement sheet having a second plurality of structural support rows. The first reinforcement sheet also includes a connector row and first flexible links attaching the first plurality of structural support rows. The first plurality of structural support rows includes a first support row and a second support row. The connector row includes a first connector and a second connector. The first and second connectors define a first height. The plurality of structural support rows includes an end structural support row. The end structural support row has a first structural support connector and a second structural support connector. The first and second structural support connectors are secured by a first structural rib. The first and second structural support connectors define a second height. The first connector is nested within the first structural support connector and the second connector is nested within the second structural support connector to secure the first reinforcement sheet to the second reinforcement sheet in a mounted configuration. The first height is less than the second height.

In another aspect, a preferred embodiment of the present invention is directed to a ground reinforcing structure for positioning on a ground surface and containing loose masonry materials. The ground reinforcing structure includes a first reinforcement sheet having a first plurality of structural support rows and first flexible links attaching the first plurality of structural support rows. The first plurality of structural support rows includes a first support row and a second support row. The first reinforcement sheet defines a longitudinal direction and a lateral direction. The first and second support rows extend generally parallel to the lateral direction and the first flexible links extending substantially in the longitudinal direction to connect the first and second support rows. The first support row includes a first rear end and a first front end and the second support row includes a second rear end and a second front end. The first rear end is positioned at a first offset relative to the second rear end measured substantially parallel to the lateral direction.

In a further aspect, a preferred embodiment of the present invention is directed to a ground reinforcing structure for positioning on a ground surface and containing loose masonry materials. The ground reinforcing structure includes a first reinforcement sheet having a first plurality of structural support rows and first flexible links attaching the first plurality of structural support rows. The first plurality of structural support rows includes a first support row and a second support row. The first and second support rows extend in and define a lateral direction. The first support row defines a first structural height and the second support row defines a second structural height. The first flexible links define a first link height. The first structural height is at least four times greater than the first link height and the second structural height is at least four times greater than the first link height. The first support row defines a first inner end and the second support row defines a second inner end. The first and second inner ends define an overlap distance measured substantially parallel to the longitudinal direction.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. Unless specifically set forth herein, the terms "a", "an" and "the" are not limited to one element but instead should be read as meaning "at least one". The words "right," "left," "lower," "upper," "longitudinal," "lateral," "front," and "rear" designate directions in the drawings to which reference is made. The words "inwardly" or "distally" and "outwardly" or "proximally" refer to directions toward and away from, respectively, the geometric center or orientation of the ground reinforcing structure, the reinforcement sheets and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-8, the preferred invention is directed to a ground reinforcing structure or permeable paver, generally designated 10, for positioning on a ground surface and containing loose masonry materials (not shown). The ground reinforcing structure 10 is generally open or has multiple openings to receive and retain the masonry material therein and is preferably, readily transportable for installation and manipulation by a user, such as an installer. The assembled ground reinforcing structure 10 is also preferably permeable to water such that rainfall seeps through the structure 10 for absorption into underling soil.

The preferred ground reinforcing structure or permeable paver 10 includes a first reinforcement sheet 12. The first reinforcement sheet 12 has a first plurality of structural support rows 14, a connector row 16 and first flexible links 18 attaching the first plurality of structural support rows 14 to each other. In the preferred embodiment, the first plurality of structural support rows 14 includes a first support row 14a, a second support row 14b, a third support row 14c, a fourth support row 14d, a fifth support row 14e, a sixth support row 14f, a seventh support row 14g and an eighth support row 14h. The first reinforcement sheet 12 preferably defines a longitudinal axis or direction 22 and a lateral axis or direction 20 and the first plurality of structural support rows 14 extends generally in the lateral direction 20. The first reinforcement sheet 12 is not limited to including the eight (8) support rows 14a, 14b, 14c, 14d, 14e, 14f, 14g, 14h and preferably has two (2) or more structural support rows 14 extending generally in the lateral direction 20 of the first sheet 12. The structural support rows 14 are preferably relatively rigid along their length and are designed and configured to structurally support a vehicle travelling over the first sheet 12 under a compression load. The structural support rows 14 are also preferably designed and configured receive the loose masonry material therein to stabilize the loose masonry material relative to the first sheet 12 in an installed configuration.

Referring to FIGS. 1-4, the preferred first sheet 12 has a straight connector row 16a and an offset connector row 16b. The straight connector row 16a extends along an edge of the first sheet 12 generally parallel to the first plurality of structural support rows 14 and the offset connector row 16b is comprised of individual connectors 17 attached to front ends of each of the first plurality of structural support rows 14. The straight connector row 16a of the preferred embodiment includes eight (8) individual connectors 17 aligned in a substantially straight row extending generally parallel to the lateral direction 20 and the offset connector row 16b includes eight (8) connectors 17 staggered or alternatingly offset from each other at the front ends of the first plurality of structural support rows 14. The straight and offset connector rows 16a, 16b are not limited to the design and configuration of the preferred embodiment and may be otherwise configured and arranged, as long as the connector rows 16 are attached to the first preferred sheet 12 and are positioned to engage an adjacent sheet in an installed configuration, as is described in greater detail below.

Referring to FIGS. 1-4 and 6-8, each of the connector rows 16 of the preferred first sheet 12 includes at least two (2) individual connectors 17, including a first connector 17a and a second connector 17b. The first and second connectors 17a, 17b may be positioned nearly anywhere along the rows 16 and, in the preferred embodiment, may be positioned at nearly any location within the eight (8) connectors 17 of the straight connector row 16a or within the eight (8) connectors 17 of the offset connector row 16b. Each of the connectors 17, including the first and second connectors 17a, 17b has substantially the same design and configuration in the preferred embodiment of a generally cylindrically-shaped or ring-shaped member that define a first height $H_1$. Each of the connectors 17, however, is not limited to having the preferred cylindrically-shaped or ring-shaped configuration and may be otherwise designed and configured, such as having a generally square-shape, hexagonal-shape, octagonal-shape or other shape that preferably includes a central hollow to allow permeation of water therethrough.

The connector rows 16 are preferably secured to the first structural support rows 14 by a first plurality of connector links 24 that have a relatively low profile and a flexible. The first plurality of connector links 24 include a first plurality of straight connector links 24a that secure the straight connector row 16a to one of the first plurality of structural support rows 14, such as the second support row 14b or the eighth support row 14h depending on how many structural support rows 14 the sheet 12 includes, and a first plurality of offset connector links 24b that secure the offset connector row 16b at the front ends of the first plurality of structural support rows 14. The first straight connector links 24a preferably extend generally in the longitudinal direction 22 to position the first straight connector row 16a from the adjacent one of the first plurality of structural support rows 14, which is the eighth support row 14h in the first preferred embodiment. The first straight connector links 24a may also connect to the second support row 14b if the first preferred sheet 12 includes only first and second support rows 14a, 14b. The first offset connector links 24b are preferably relatively short and connect the offset connector row 16b to the front ends of the first plurality of structural support rows 14. The generally offset configuration of the adjacent first plurality of structural support rows 14 relative to each other, thereby results in each adjacent individual connector 17 of the offset connector row 16b also being offset relative to each other in the longitudinal direction 22.

Referring to FIGS. 1-4, the first reinforcement sheet 12 is preferably configured to roll into a rolled configuration, wherein the first plurality of structural support rows 14 pivots relative to each other about the first flexible links 18. FIG. 2A shows the first reinforcement sheet 12 in a partially rolled configuration with the first, second and third support rows 14a, 14b, 14c substantially in their respective positions of the rolled configuration and the fourth, fifth, sixth, seventh and eighth support rows 14d, 14e, 14f, 14g, 14h positioned generally planar relative to each other. In the rolled configuration, the first flexible links 18 are each preferably elastically deformed or curved, thereby acting substantially as living hinges, to facilitate pivoting of the first plurality of structural support rows 14 relative to each other in the rolled configuration. The rolled configuration facilitates transport and installation of the first reinforcement sheet 12, as will be described in greater detail below. The first flexible links 18 each preferably flex or deform about the lateral axis or lateral direction 20 in the rolled configuration.

Figure 1:
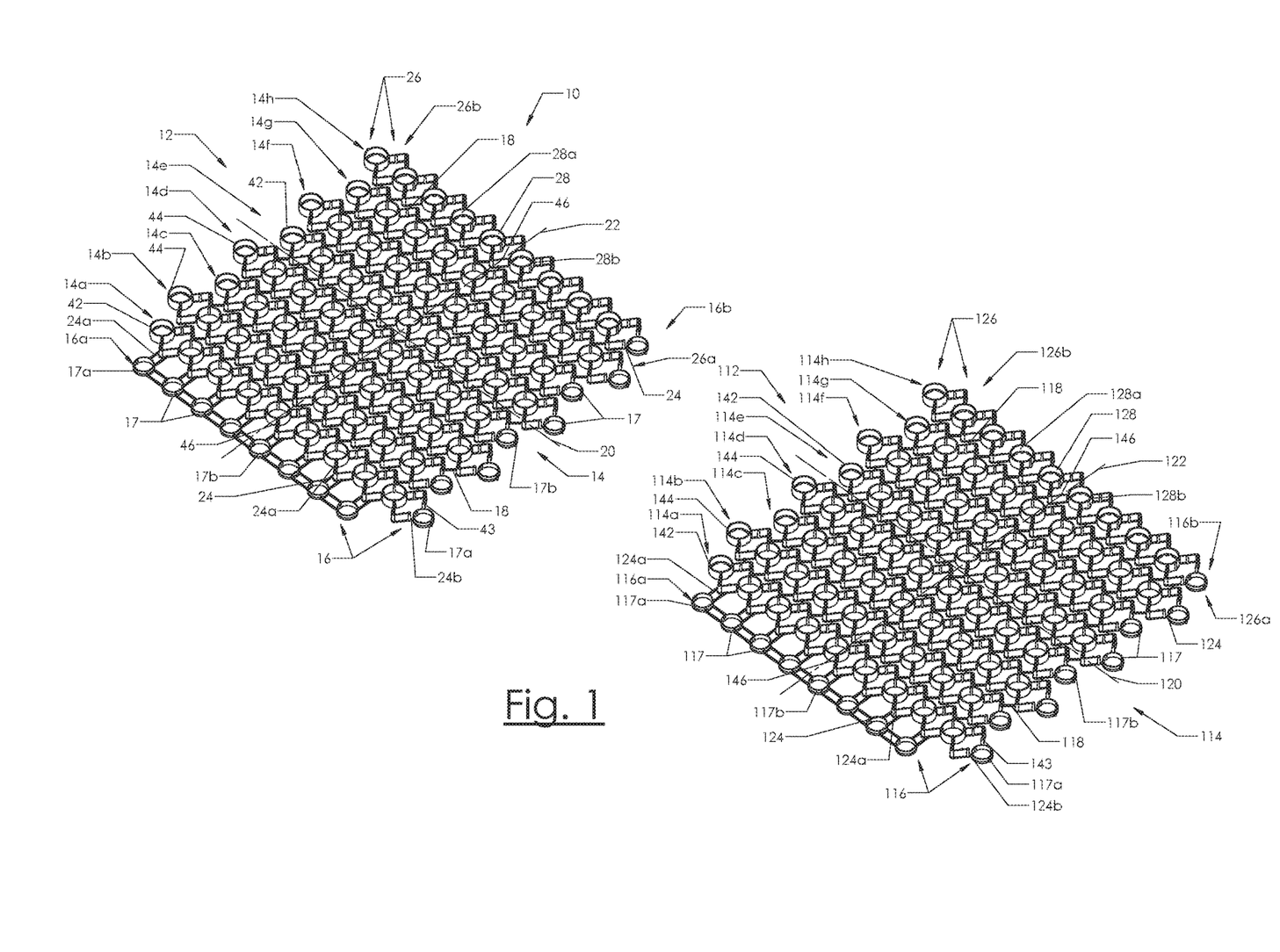
FIG. 1 is a top perspective view of a ground reinforcing structure in accordance with a preferred embodiment of the present invention, including a first reinforcing sheet and a second reinforcing sheet.

Referring to FIG. 1, the preferred ground reinforcing structure 10 also includes a second reinforcement sheet 112 that is designed and configured substantially the same as the first reinforcement sheet 12. The same reference numbers from the first reinforcement sheet 12 are utilized to identify similar features of the second reinforcement sheet 112 with a "1" prefix to distinguish the features of the second reinforcement sheet 112 herein. The second reinforcement sheet 112 includes a second plurality of structural support rows 114, including first, second, third, fourth, fifth, sixth, seventh and eighth support rows 114a, 114b, 114c, 114d, 114e, 114f, 114g, 114h. The second reinforcement sheet 112 also has second connector rows 116, including a second straight connector row 116a and a second offset connector row 116b, each with individual connectors 117. Second flexible links 118 connect or secure the second plurality of structural support rows 114 together so that they can be rolled into the rolled configuration. The first and second flexible links 18, 118 are preferably connected to bottom portions of the first and second plurality of structural support rows 14, 114, respectively, such that the first and second flexible links 18, 118 are proximate a support surface (not shown) in an installed configuration. The relatively low positioning of the flexible links 18, 118 also facilitates connection of the first and second sheets 12, 112 to each other in the configuration, as is described in greater detail below. The second sheet 112 also defines a second lateral axis 120 that is substantially parallel to the second plurality of structural support rows 114 and the second longitudinal axis 122 that extends substantially perpendicular to the second lateral axis 120.

Referring to FIGS. 1-4, the second sheet 112 also includes and second end structural support row 126 that is positioned along one of the free edges of the second sheet 112. In the preferred embodiment, the second end structural support row 126 includes a second straight end structural support row 126a, which is the eighth support row 114h in the preferred embodiment of the second sheet 112, and a second offset end structural support row 126b that is positioned at an opposite edge of the second sheet 112 from the second offset connector row 116b. The second straight end structural support row 126a is positioned at an opposite side of the second sheet 112 from the second straight connector row 116a in the preferred embodiment. The first reinforcement sheet 112 also includes first end structural support rows 26, including a first straight end structural support row 26a and a first offset end structural support row 26b. The end structural support row 126 of the second sheet 112 has a first structural support connector 128a and a second structural support connector 128b. The first and second structural support connectors 128a, 128b are preferably comprised of portions or members of the second plurality of structural support rows 114 at edges of the second sheet 112 opposite the second straight and offset connector rows 116a, 116b. The first sheet 12 also has first end structural support rows 26, including a first straight end structural support row 26a and a first offset structural support row 26b, which are positioned opposite the first straight connector row 16a and the first offset connector row 16b, respectively. The first straight end structural support row 26a is the eighth support row 14h in the first sheet 12, although the first straight end structural support row 26a is not limiting and the first straight end structural support row 26a may be comprised of any of the second through eighth or more support rows 14a, 14b, 14c, 14d, 14e, 14f, 14g, 14h of the first sheet 14. The connector rows 16, 116 and end structural support rows 26, 126 of the first and second sheets 12, 112 are preferably positioned opposite to each other, respectively, to facilitate engagement and connecting of adjacent sheets 12, 112 in the installed configuration, as is described in greater detail below.

Referring to FIGS. 1-9, in the preferred embodiment, the first and second structural support connectors 128a, 128b may be comprised of any of an individual structural connector 128 positioned within the second end structural support rows 126 of the second sheet 112. The first sheet 12 also includes individual structural connectors 28 that may be positioned within the first end structural support rows 26. The structural support connectors 28, 128 are described generically herein as any of the structural support connectors 28, 128 that may be located in the first and second end structural support rows 26, 126 of the first and second sheets 12, 112.

The structural support connectors 28, 128 define a second height $H_2$ that is approximately one-half to two inches (½-2") in the preferred embodiment and, more preferably, approximately one inch (1"). The first height $H_1$ of the connectors 17, 117 is approximately one-quarter to one inches (¼-1¾") in the preferred embodiment and, more preferably, approximately one-half inch (½"). Any of the preferred connectors 17, 117 are preferably nestable within any of the structural support connectors 28, 128 to secure the first and second sheets 12, 112 together in an assembled and installed configuration, preferably by aligning the straight connector rows 16a, 116a with the straight end structural support rows 26a, 126a or by aligning the offset connector rows 16b, 116b with the offset end structural support rows 26b, 126b. The individual connectors 17, 117 and structural support connectors 28, 128 are preferably engaged to secure the first reinforcement sheet 12 to the second reinforcement sheet 112 in a mounted configuration. This nesting of the connectors 17, 117 within the structural support connectors 28, 128, each of which is incorporated into the macro structure of the sheets 12, 112 is an improvement over separate dedicated connecting structures of prior art permeable pavers.

Figure 6:
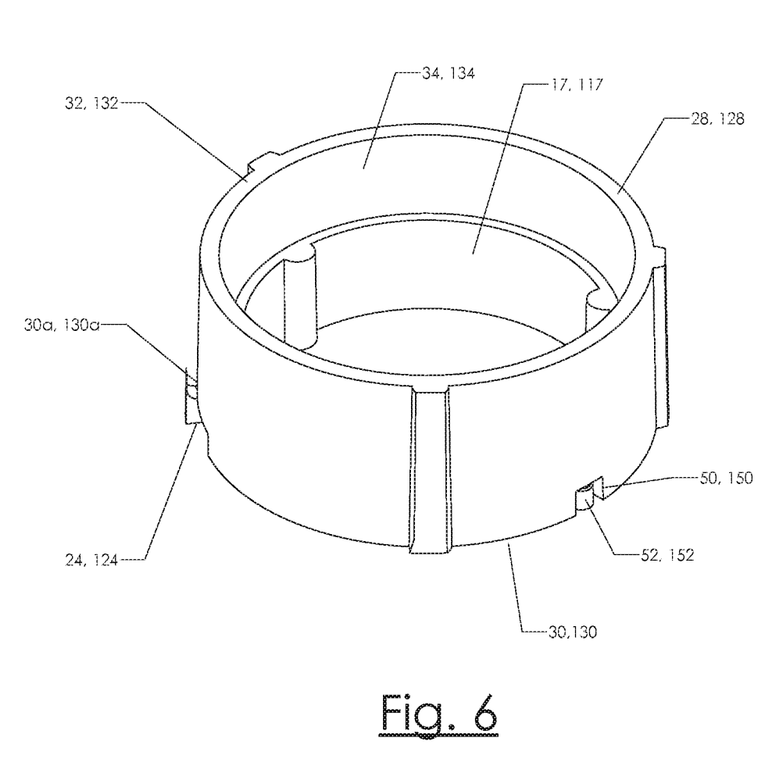
FIG. 6 is a top perspective view of a connector nested within a structural support connector of the first reinforcing sheet of FIG. 2.
Figure 7:
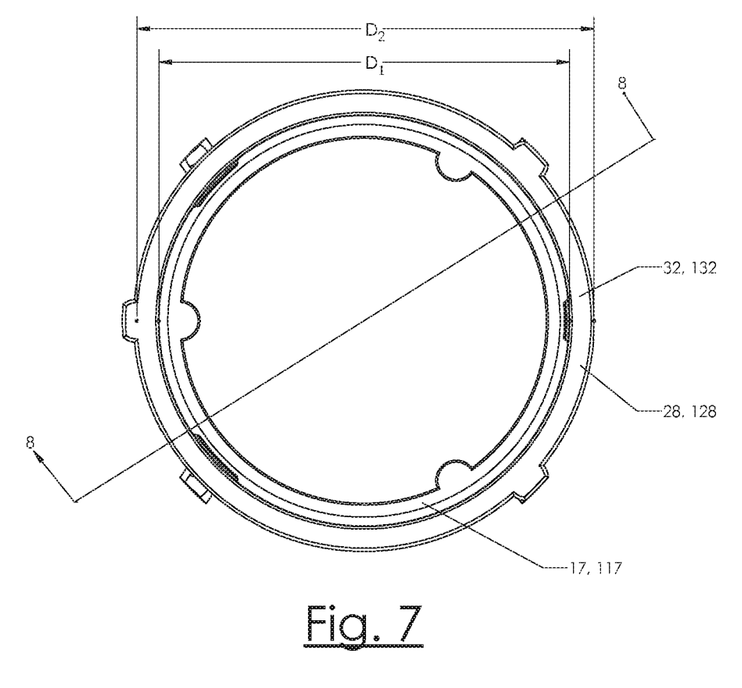
FIG. 7 is a top plan view of the connector nested within the structural support connector of FIG. 6.
Figure 8:
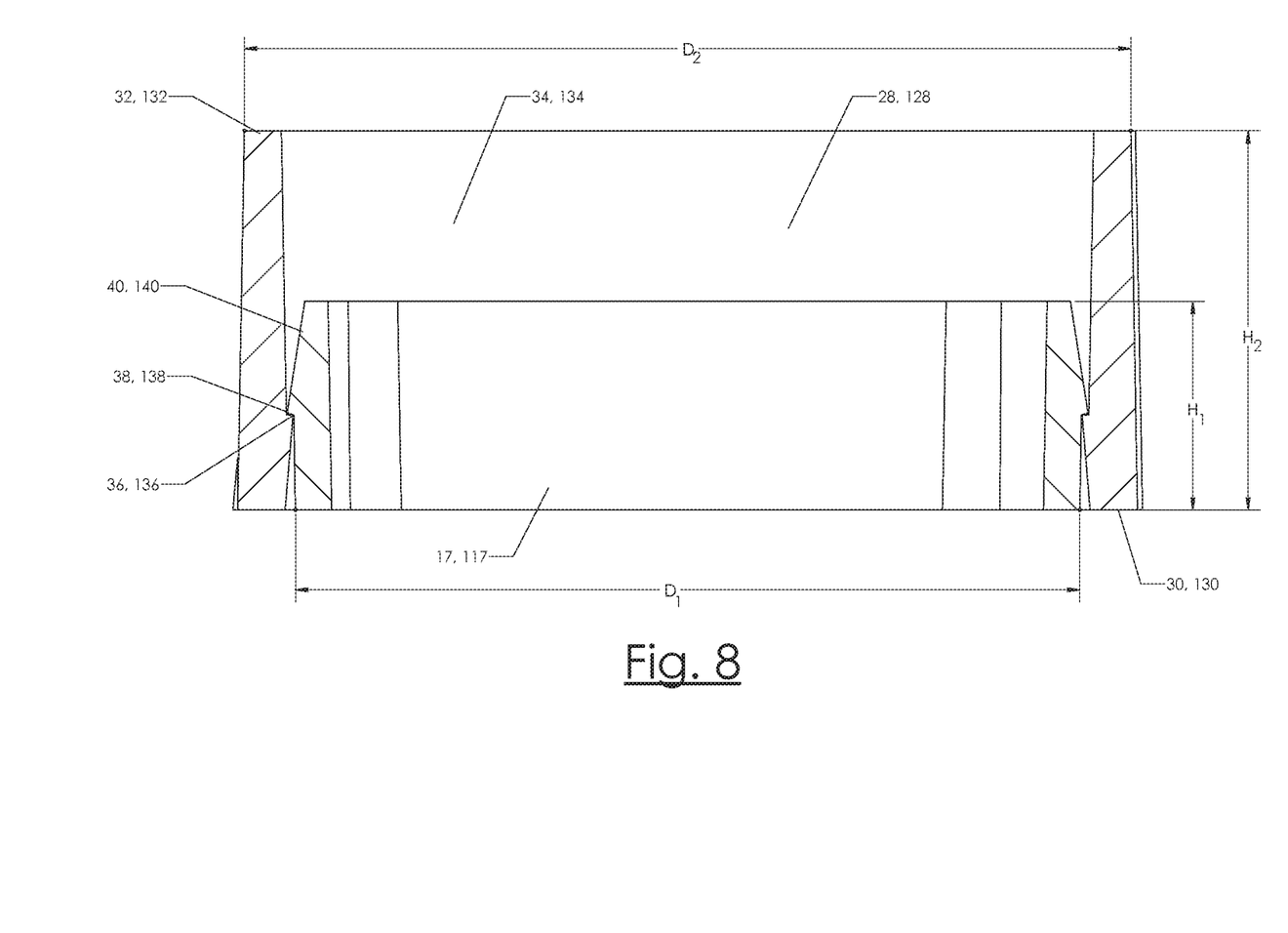
FIG. 8 is cross-sectional view of the connector nested within the structural support connector of FIG. 6, taken along line 8-8 of FIG. 7.

Referring to FIGS. 6-8, the connectors 17, 117, including the first and second connectors 17a, 17b, 117a, 117b, has a substantially cylindrical or ring shape defining a first diameter $D_1$. The structural support connectors 28, 128, including the first and second structural support connectors 28a, 28b, 128a, 128b also have a substantially cylindrical or ring shape defining a second diameter $D_2$. The first diameter $D_1$ is less than the second diameter $D_2$ such that the connectors 17, 117 are positionable within or nestable in the structural support connectors 28, 128. The connectors 17, 117 and structural support connectors 28, 128 are not limited to being cylindrical or ring shaped and may have other shapes and configurations, such as square, hexagonal, octagonal or other shapes, as long as the connectors 17, 117 are nestable within the structural support connectors 28, 128 to connect the connectors 17, 117 and structural support connectors 28, 128 together, thereby connecting the first sheet 12 to the second sheet 112.

Referring to FIGS. 1-3, 6 and 8, the preferred structural support connectors 28, 128 have a bottom surface 30, 130 and a relief notch 30a, 130a through the bottom surface 30, 130. At least one of the connector links 24, 124 is positioned in the relief notch 30a, 130a in the mounted, assembled or installed configuration. The relief notch 30a, 130a provides an opening or path for the connector link 24, 124 to extend through in the mounted configuration so that the bottom surface 30, 130 of the structural support connectors 28, 128 does not cut or damage the connector link 24, 124 when the connectors 17, 117 are nested within the structural support connectors 28, 128. Each of the structural support connectors 28, 128 includes two relief notches 30a, 130a in the preferred embodiment to accommodate the two (2) connector links 24, 124 that secure each of the connectors 17, 117 to the structural support rows 14, 114. The connector links 24, 124 and the relief notches 30a, 130a are preferably positioned adjacent or in facing engagement with a support surface in the installed configuration to space the connector links 24, 124 from top surfaces 32, 132 of the structural support connectors 28, 128 where load is applied to the reinforcement sheets 12, 14. The positioning of the connector links 24, 124 and the relief notches 30a, 130a near or at the bottom surfaces 30, 130 also accommodates rolling the first and second sheets 12, 112 into the rolled configuration. The first height $H_1$ of the structural support connectors 28, 128 is preferably defined between the top surface 32, 132 and the bottom surface 30, 130. Referring to FIG. 6, each of the connectors 17, 117 may also include an engagement pin 52, 152 extending away from the center of the first and second sheets 12, 112 adjacent the bottom surface 30, 130 and opposite the connector links 24, 124. The preferred structural support connectors 28, 128 also includes an engagement notch 50, 150 that aligns and is positioned around the engagement pin 52, 152 in the locked configuration. The engagement pin 52, 152 preferably connects to the engagement notch 50, 150 to secure the connectors 17, 117 in the structural support connectors 28, 128 and limit disengagement under certain bending loads that may cause the connectors 17, 117 to pivot or tip within the structural support connectors 28, 128 and potentially disengage if the engagement pin 52, 152 and engagement notch 50, 150 were not included in the assembly.

Referring to FIGS. 6 and 8, the structural support connector 28, 128 preferably has an internal surface 34, 134 and a cylindrical ledge 36, 136 defined on the internal surface 34, 134. The connector 17, 117 preferably has a substantially cylindrical hook 38, 138 on an external surface 40, 140. The cylindrical hook 38, 138 engages the cylindrical ledge 36, 136 in the mounted configuration when the connectors 17, 117 are nested within the structural support connectors 28, 128. The connectors 17, 117 are not limited to including the cylindrical hook 38, 138 and the structural support connectors 28, 128 are not limited to including the cylindrical ledge 36, 136 and the connectors 17, 117 and structural support connectors 28, 128 may be otherwise connected or secured together when nested, such as by clamping, force fitting, adhesively bonding, welding or otherwise secured together. The external surface 40, 140 of the connector 17, 117 preferably tapers slightly outwardly from its top to the hook 38, 138 and the internal surface 34, 134 of the structural support connector 28, 128 preferably tapers slightly inwardly from the bottom surface 30, 130 to the cylindrical ledge 36, 136. This tapering of the internal surface 34, 134 and the external surface 40, 140 provides some relief for aligning the structural support connector 28, 128 with the connector 17, 117 to facilitate positioning in the nested configuration and gradual application of force to the top surface 32, 132 of the structural support connector 28, 128 to engage the hook 38, 138 with the ledge 36, 136. The hook 38, 138 and ledge 36, 136 are not limited to being comprised of full cylindrical features on the structural support connector 28, 128 and the connector 17, 117 and may be comprised of partial cylindrical features, a tab-like feature or several tabs formed on the structural support connector 28, 128 and the connector 17, 117. In addition, the hook 38, 138 and ledge 36, 136 are preferably integrally formed or molded with the structural support connector 28, 128 and the connector 17, 117, respectively. The hook 38, 138 and the ledge 36, 136 preferably self-align and snap together in the nested configuration and may produce an audible snap when in the nested configuration to provide an audible indication to the installer that the connectors 17, 117 are locked and secured to the structural support connectors 28, 128. This alignment and lockable nesting may be accomplished by aligning the structural support connectors 28, 128 with the connectors 17, 117 and stepping on the top surface 32, 132 when the sheets 12, 112 are positioned on a support surface.

In the nested configuration, the connectors 17, 117 with their first height $H_1$ that is smaller than the second height $H_2$ of the structural support connectors 28, 128 generally do not carry compressive loads from vehicles, persons, debris or other materials that move over or are positioned on the assembled sheets 12, 112. A benefit of the nested connection of the connectors 17, 117 with the structural support connectors 28, 128 is that the connection is located near the bottom surface 30, 130 and the ground support surface. Connecting the connectors 17, 117 and the structural support connectors 28, 128 near the bottom of the assembly, as opposed to closer to the top surface of the sheets 12, 112, limits the chance of the connections failing due to the wear and tear that takes place on the top surface 32, 132 of the structural support connector 28, 128. These connections are much stronger than a simple snap connector due to the structural geometry of the structural support connector 28, 128 and the connector 17, 117. Additionally, these connections are difficult to break or come apart, unlike snap connectors which can fail with little force. A preferred goal of the preferred connection is to align the male connector 17, 117 of a sheet 12, 112 that is installed on a support surface with a subsequently positioned female structural support connector 28, 128 or a series of structural support connectors 28, 128 of an adjacent sheet 12, 112 that is rolled out onto the support surface. A following worker subsequently steps on the structural support connector 28, 128, which is aligned with the underlying connector 17, 117, to nest the connector 17, 117 in the structural support connector 28, 128. This preferred configuration results in a faster assembly process to connect adjacent sheets 12, 112 and a stronger connection between the sheets 12, 112.

Figure 2:
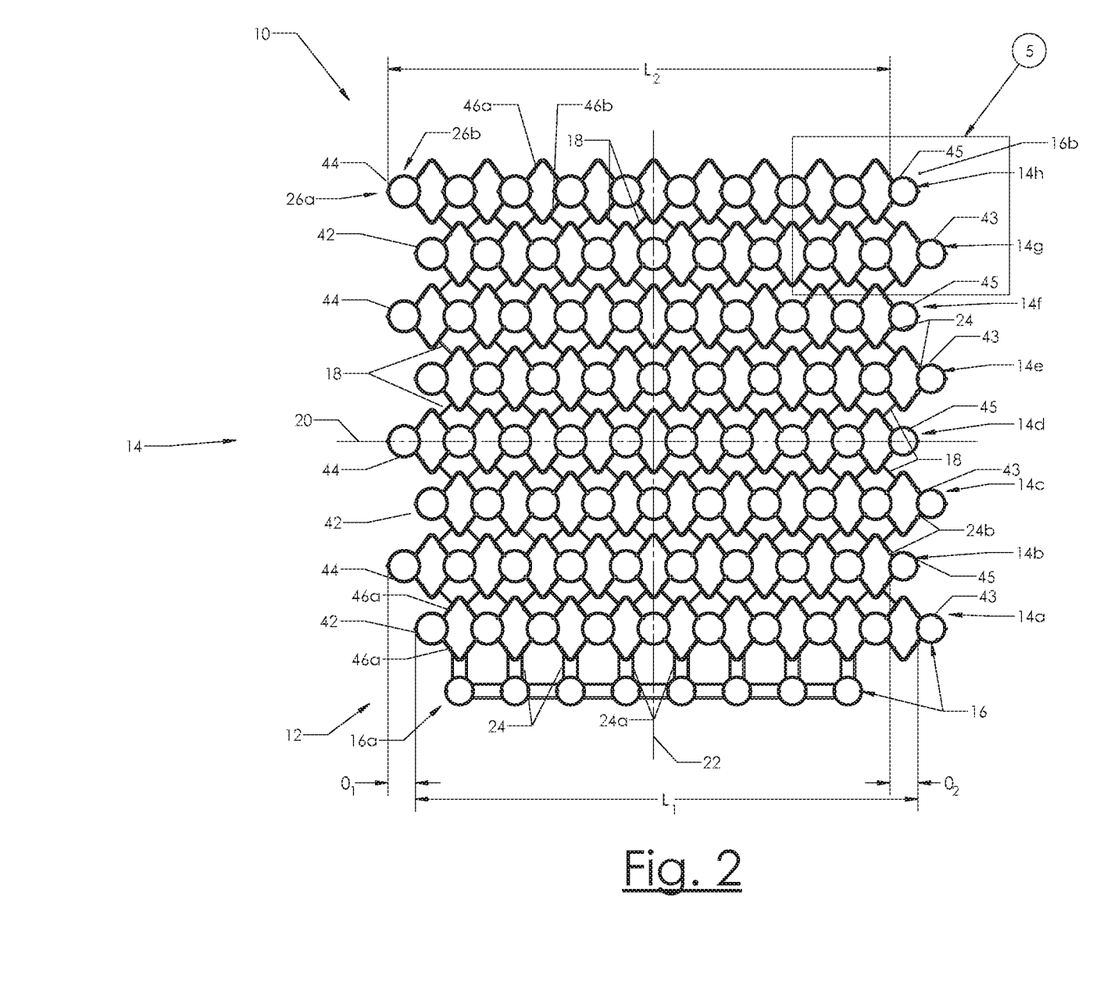
FIG. 2 is a top plan view of the first reinforcing sheet of the ground reinforcing structure of FIG. 1.
Figure 2A:
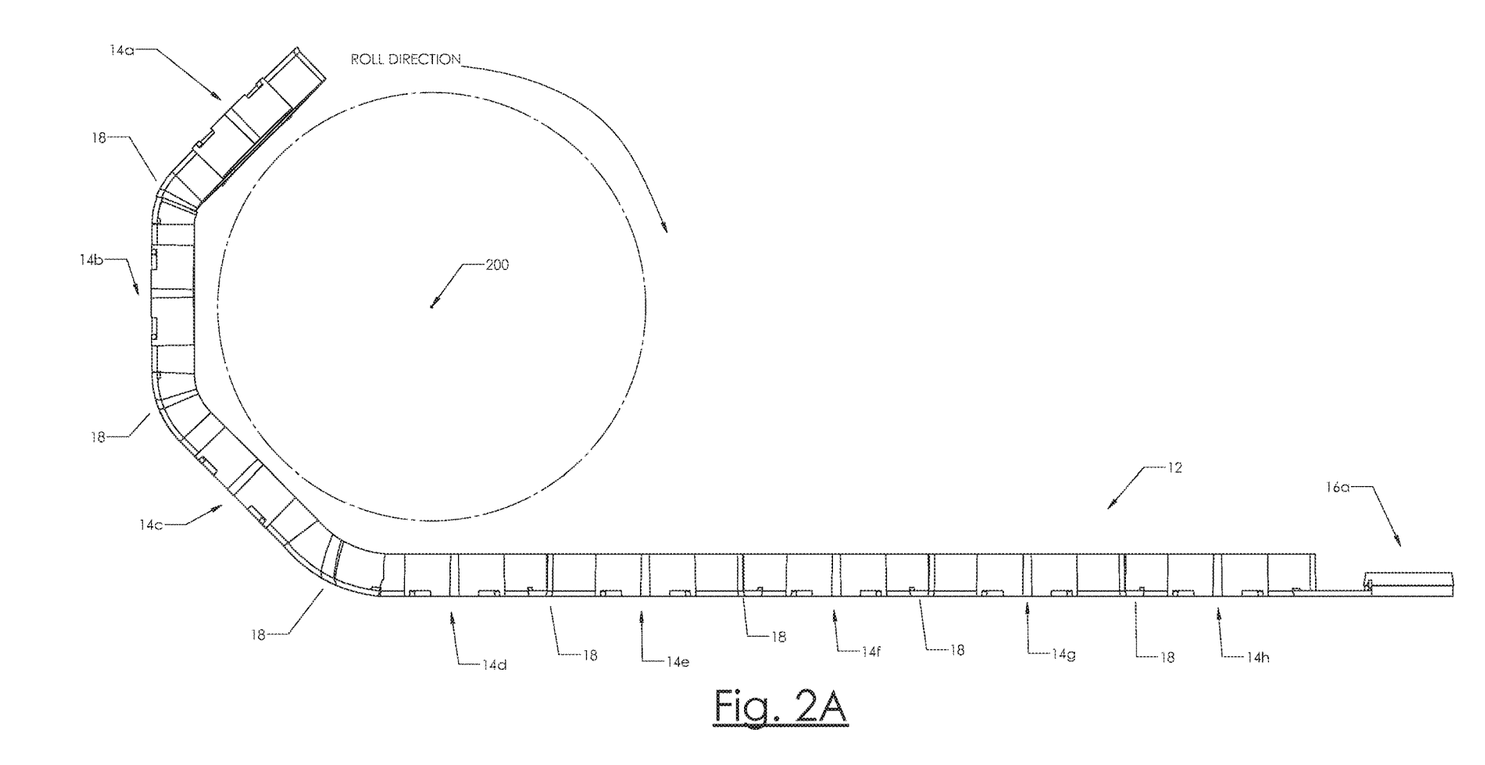
FIG. 2A is a rear elevational view of the first reinforcing sheet of FIG. 2 in a partially rolled configuration.
Figure 3:
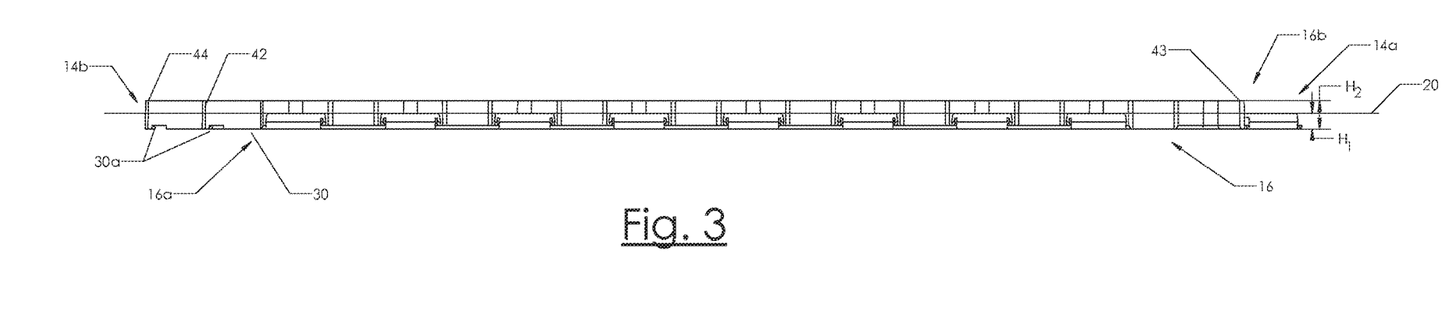
FIG. 3 is a front elevational view of the first reinforcing sheet of FIG. 2.
Figure 4:
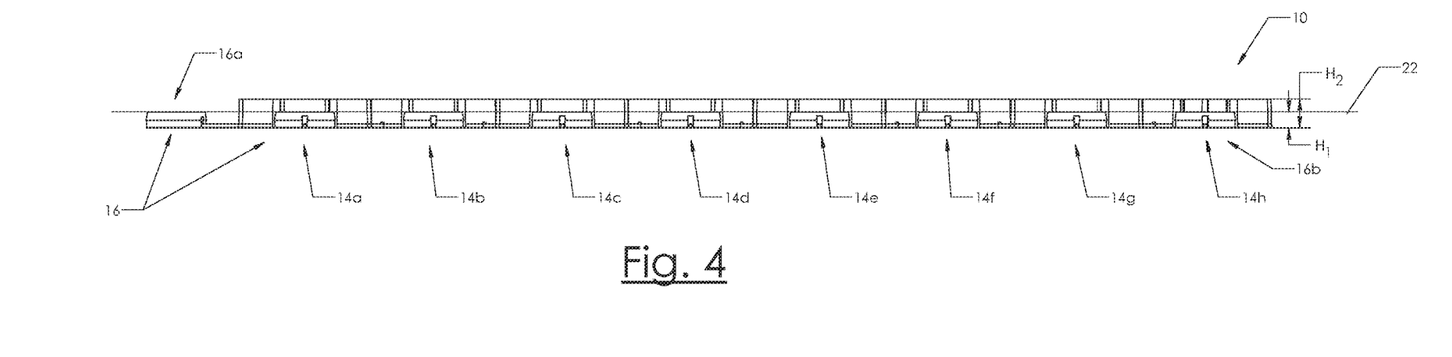
FIG. 4 is a right-side elevational view of the first reinforcing sheet of FIG. 2.

Referring to FIGS. 1-2A, the first and second support rows 14a, 14b, 114a, 114b of the first and second sheets 12, 112 extend generally in or parallel to the lateral direction 20, 120. The flexible links 18, 118 preferably extend substantially in the longitudinal direction 22, 122 to secure the first and second support rows 14a, 14b, 114a, 114b to each other. The flexible links 18, 118 also preferably secure each of the generally parallel extending support rows 14a, 14b, 14c, 14d, 14e, 14f, 14g, 14h, 114a, 114b, 114c, 114d, 114e, 114f, 114g, 114h to each other. The flexible links 18, 118 do not necessarily extend generally parallel to the longitudinal direction 22, 122, as the preferred flexible links 18, 118 extend at approximately a forty-five degree (45°) angle relative to the longitudinal direction 22, 122 to connect the adjacent support rows 14a, 14b, 14c, 14d, 14e, 14f, 14g, 14h, 114a, 114b, 114c, 114d, 114e, 114f, 114g, 114h. As a result of the flexibility of the flexible links 18, 118 that both bend and pivot as a result of extending at the forty-five degree (45°) angle and the configuration of the support rows 14a, 14b, 14c, 14d, 14e, 14f, 14g, 14h, 114a, 114b, 114c, 114d, 114e, 114f, 114g, 114h, the reinforcement sheets 12, 112 are configured to roll into a rolled configuration (not shown) by pivoting about a roll axis 200. The roll axis 200 extends substantially parallel to the lateral direction 20, 120. The flexible links 18, 118 are preferably, elastically deformed in bending and rotation in the rolled configuration, such that the rolled sheets 12, 112 are readily transportable and positionable relative to each other for installation and assembly. The sheets 12, 112 are preferably integrally formed or molded of a polymeric material, such as a high density polyethylene (HDPE), polypropylene (PP) or polyvinyl chloride (PVC), such that the flexible links 18, 118 function as living hinges to facilitate rolling the sheets 12, 112 into the rolled configuration.

Figures 5, 5A:
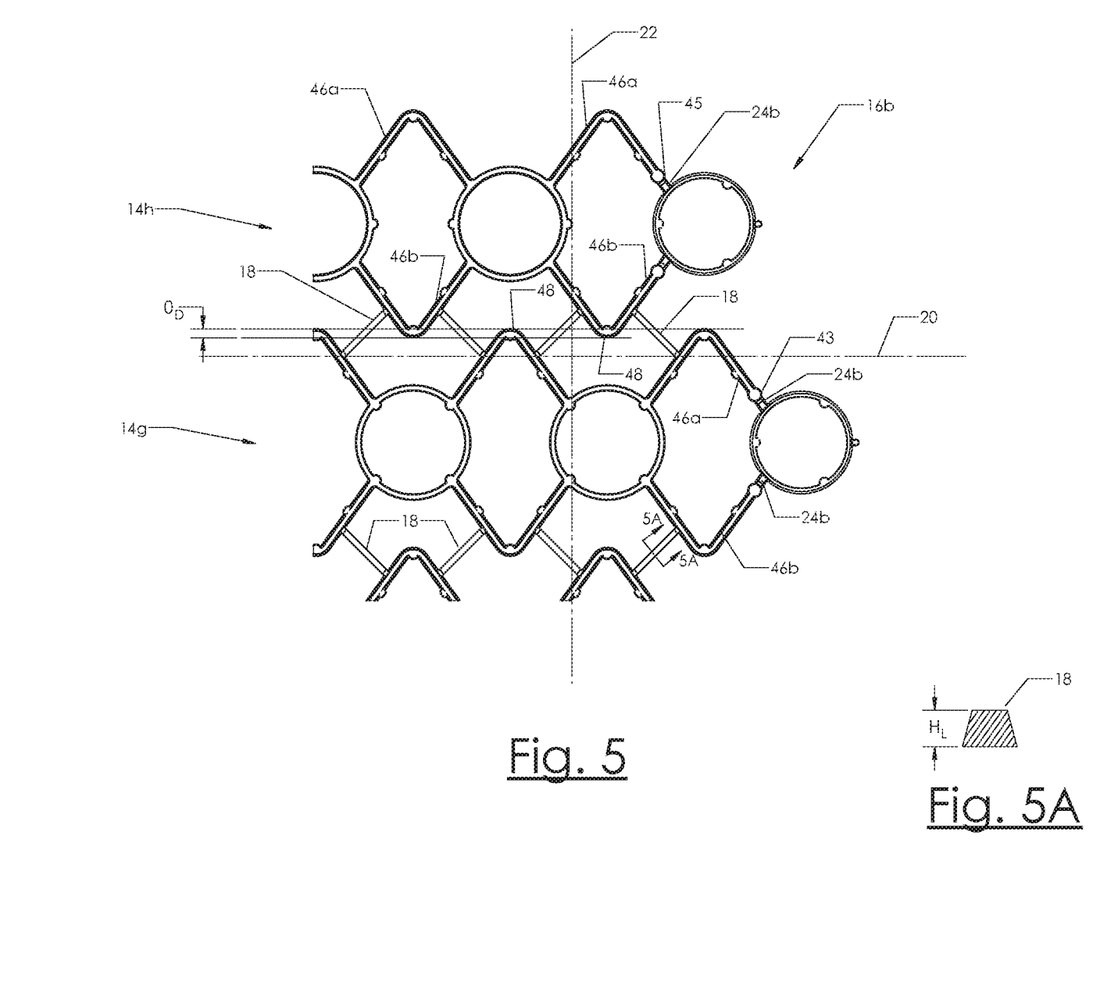
FIG. 5 is a magnified top perspective view of the first reinforcing sheet of FIG. 2, taken from within shape 5 of FIG. 2.
FIG. 5A is a cross-sectional view of a flexible link of the first reinforcing sheet of FIG. 2, taken along line 5A-5A of FIG. 5.

Referring to FIGS. 1, 2 and 5, the first, third, fifth and seventh support rows 14a, 14c, 14e, 14g, 114a, 114c, 114e, 114g of the preferred sheets 12, 112 include a first rear end 42, 142 and a first front end 43, 143 and the second, fourth, sixth and eighth support rows 14b, 14d, 14f, 14h, 114b, 114d, 114f, 114h include a second rear end 44, 144 and a second front end 45, 145. The first rear ends 42, 142 are positioned at a first offset $O_1$ relative to the second rear end 44, 144 and the first front ends 43, 143 are positioned at a second offset $O_2$ relative to the second front ends 45, 145, both of which are measured substantially parallel to the lateral direction 20, 120. The first and second offsets $O_1$, $O_2$ are preferably, approximately two to two and one-half inches (2-2½") in the preferred embodiment, but are not so limited and may be otherwise sized and configured based on designer or user preferences and particular loading and use conditions. The offset connector row 16b, 116b of the preferred embodiment is positioned adjacent the front ends 43, 45, 143, 145 and the offset end structural support row 26b, 126b is associated with the rear ends 42, 44, 142, 144. The first and second offsets $O_1$, $O_2$ at the front and rear ends 43, 45, 143, 145, 42, 44, 142, 144 of the sheets 12, 112 continuously offsets the edges of adjacent connected sheets 12, 112 to alleviate a consistent bending moment that is created if there is no offset at the front and rear ends 43, 45, 143, 145, 42, 44, 142, 144. A tire driving over a joining line between two sheets 12, 112 with the preferred offsets $O_1$, $O_2$ readily transitions the compressive load from the tire between the two sheets 12, 112 by sharing the load and limiting rutting at the intersection of the sheets 12, 112.

In the preferred embodiment, the first, third, fifth and seventh support rows 14a, 14c, 14e, 14g, 114a, 114c, 114e, 114g have a first length $L_1$ defined between the first rear end 42, 142 and the first front end 43, 143 and the second, fourth, sixth and eighth support rows 14b, 14d, 14f, 14h, 114b, 114d, 114f, 114h have a second length $L_2$ defined between the second rear end 44, 144 and the second front end 45, 145. The first and second lengths $L_1$, $L_2$ are preferably, substantially the same and are approximately two and one-half feet to three and one-half feet (2½-3½') and are approximately three feet (3') in the preferred embodiment. The first and second lengths $L_1$, $L_2$ are not limited to the dimensions described above and may be constructed of at least twice or three times greater than the preferred lengths $L_1$, $L_2$, although the described preferred range is preferred for transportability and maneuverability of the sheets 12, 112.

The first and second structural support connectors 28, 128 or each of the structural support connectors 28, 128 are preferably secured together in the first and second plurality of support rows 14, 114 by a first structural rib 46, 146, which is comprised of a pair of structural ribs 46a, 46b, 146a, 146b in the preferred embodiment. Each of the adjacent pairs of structural support connectors 28, 128 in the plurality of structural support rows 14, 114 are connected by pairs of structural ribs 46a, 46b, 146a, 146b having the same second height H$_2$ of the structural support connectors 28, 128, thereby defining substantially stiff support rows 14a, 14b, 14c, 14d, 14e, 14f, 14g, 14h, 114a, 114b, 114c, 114d, 114e, 114f, 114g, 114h in the lateral direction 20, 120. The loose masonry material is also preferably positioned within a void or space between the pairs of structural ribs 46a, 46b, 146a, 146b. The flexible links 18, 118 are preferably connected to the adjacent support rows 14a, 14b, 14c, 14d, 14e, 14f, 14g, 14h, 114a, 114b, 114c, 114d, 114e, 114f, 114g, 114h at the adjacent structural ribs 46, 146, but are not so limited and may be connected to the structural support connectors 28, 128 or otherwise arranged.

In the preferred embodiment, the structural support rows 14, 114 define a structural height, which is comprised of the second height H$_2$ of the structural support connectors 28, 128 and the structural ribs 46, 146. The first and second support rows 14a, 14b, 114a, 114b have the structural height or the first and second structural heights, respectively, which is comprised of the second height H$_2$ in the preferred embodiment. The flexible links 18, 118 have a link height H$_L$, wherein the structural heights or second height H$_2$ of the plurality of structural support rows 14, 114 is at least four times greater than the link height H$_L$, such that the flexible links 18, 118 are relatively flexible and the plurality of structural support rows 14, 114 are relatively stiff, particularly in the lateral direction 20, 120. In the preferred embodiment, the structural heights or second height H$_2$ is approximately three-quarters to one and one-quarter inches (¾"-1¼") and the link height H$_L$ is approximately one-eighth of an inch (⅛"). Each of the plurality of structural support rows 14, 114 also includes an inner end 48, 148 that faces an adjacent one of the structural support rows 14, 114.

The inner ends 48, 148 are comprised of peaks of adjacent pairs of structural ribs 46a, 46b, 146a, 146b. The adjacent inner ends 48, 148 of adjacent ones of the plurality of structural support rows 14, 114 define an overlap distance O$_D$ that is measured substantially parallel to the longitudinal axis 22, 122. The overlap distance O$_D$ is approximately one-eighth to one-quarter of an inch (⅛-¼"), but is not so limited and may be otherwise designed and configured depending on the design and configuration of the associated sheets 12, 112. The overlap distance O$_D$ is configured to facilitate transfer of load between the adjacent plurality of structural support rows 14, 114, particularly as a vehicle tire travels over the structural support rows 14, 114, so that load is relatively easily transferred from adjacent rows 14, 114. The overlap prevents potential rutting at a sharp edge of adjacent ones of the plurality of structural rows 14, 114 if there was no overlap.

The structural support connectors 28, 128 are not limited to including the internal ledge 36, 136 for attachment and locking with the hook 38 of the connectors 17, 117 and may be designed and configured with relatively smooth internal surfaces 34, 134 and such structural support connectors 28, 128 may be considered central supports 28, 128. The central supports 28, 128 are preferably located internally away from the edges of the sheets 12, 112, preferably not in the straight or offset end structural support rows 26a, 26b, 126a, 126b. The central supports 28, 128 are preferably connected by the pairs of structural ribs 46a, 46b, 146a, 146b.

In the preferred embodiment, the sheets 12, 112 and each of its components, including the plurality of structural support rows 14, 114, the connector rows 16, 116 and the flexible links 18, 118 are integrally molded of a polymeric material. The integral molding of the sheets 12, 112 is preferably for structural integrity, speed of manufacturing and the ability to define relatively complex structural parts in a single operation.

In operation, the reinforcement sheets or permeable paver sheets 12, 112 are transported in the rolled configuration to a site where a support surface has been prepared. The first reinforcement sheet 12 is positioned on the support surface and unrolled onto the support surface with the bottom surface 30, 130 facing or positioned on the support surface. The second reinforcement sheet 112 is subsequently moved to a position adjacent to the first sheet 12, such that either the straight end structural support row 126a of the second sheet 112 is aligned with the straight connector row 16a of the first sheet 12 or the offset end structural support row 126b of the second sheet 112 is aligned with the offset connector row 16b of the first sheet 12. An operator preferably steps on the straight end structural support row 126a of the second sheet 112 or the offset end structural support row 126b of the second sheet 112 to engage the ledges 36, 136 of the structural support connectors 28, 128 with the hooks 38, 138 of the connectors 17, 117. In the locked configuration (FIG. 8), the first and second sheets 12, 112 are secured to each other and the loose masonry materials are filled into the voids or spaces in the sheets 12, 112. Additional sheets 12, 112 may then be added to the assembled first and second sheets 12, 112 to expand the assembly and cover nearly any amount of support surface desired by the installer.

It will be appreciated by those skilled in the art that changes could be made to the preferred embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. A ground reinforcing structure for positioning on a ground surface and containing loose masonry materials, the ground reinforcing structure comprising:
    a first reinforcement sheet having a first plurality of structural support rows, a connector row and first flexible links attaching the first plurality of structural support rows, the first plurality of structural support rows including a first support row and a second support row, the connector row including a first connector and a second connector, the first and second connectors defining a first height; and
    a second reinforcement sheet having a second plurality of structural support rows, the second plurality of structural support rows including an end structural support row, the end structural support row having a first structural support connector and a second structural support connector, the first and second structural support connectors defining a second height, the first connector nested within the first structural support connector and the second connector nested within the second structural support connector to secure the first reinforcement sheet to the second reinforcement sheet in a mounted configuration, the first height being less than the second height.

2. The ground reinforcing structure of claim 1, wherein the first connector has a substantially cylindrical shape defining a first diameter, the first structural support connector has a substantially cylindrical shape defining a second diameter, the first diameter being less than the second diameter, the first and second structural support connectors secured by a first structural rib.

3. The ground reinforcing structure of claim 1, wherein the first structural support connector has a top surface and a bottom surface, the first height defined between the top and bottom surfaces.

4. The ground reinforcing structure of claim 1, wherein the first structural support connector has an internal surface, a cylindrical ledge defined on the internal surface, the first connector including a substantially cylindrical hook on an external surface, the hook engaging the ledge in the mounted configuration.

5. The ground reinforcing structure of claim 1, wherein the connector row includes a substantially straight connector row and an offset connector row.

6. The ground reinforcing structure of claim 1, wherein the first reinforcement sheet defines a longitudinal axis and a lateral axis, the first plurality of structural support rows extending in the lateral direction.

7. The ground reinforcing structure of claim 6, wherein the first reinforcement sheet is configured to roll into a rolled configuration, the first flexible links flexing about the lateral axis in the rolled configuration.

8. The ground reinforcing structure of claim 1, wherein the connector row is secured to the second support row by a first plurality of connector links.

9. The ground reinforcing structure of claim 8, wherein the first structural support connector has a bottom surface and a first relief notch through the bottom surface, at least one of the first plurality of connector links positioned in the first relief notch in the mounted configuration.

10. A ground reinforcing structure for positioning on a ground surface and containing loose masonry materials, the ground reinforcing structure comprising:
a first reinforcement sheet having a first plurality of structural support rows and first flexible links attaching the first plurality of structural support rows, the first plurality of structural support rows including a first support row and a second support row, the first reinforcement sheet defining a longitudinal direction and a lateral direction, the first and second support rows extending generally parallel to the lateral direction and the first flexible links extending substantially in the longitudinal direction, the first support row including a first rear end and a first front end and the second support row including a second rear end and a second front end, the first rear end positioned at a first offset relative to the second rear end measured substantially parallel to the lateral direction.

11. The ground reinforcing structure of claim 10, wherein the first front end is positioned at a second offset relative to the second front end measured substantially parallel to the lateral direction.

12. The ground reinforcing structure of claim 10, wherein the first support row has a first length defined between the first rear end and the first front end and the second support row has a second length defined between the second rear end and the second front end, the first length being substantially the same and the second length.

13. The ground reinforcing structure of claim 10, wherein the first offset is approximately two to two and one-half inches (2-2½").

14. The ground reinforcing structure of claim 10, wherein the first reinforcement sheet is configured to roll into a rolled configuration by pivoting about a roll axis, the roll axis extending substantially parallel to the lateral direction, the first flexible links being elastically deformed in the rolled configuration.

15. The ground reinforcing structure of claim 10, further comprising:
a connector row attached to the first reinforcement sheet, the connector row including a first connector and a second connector; and
a second reinforcement sheet having a second plurality of structural support rows, the second plurality of structural support rows including an end structural support row, the end structural support row having a first structural support connector and a second structural support connector, the first and second structural support connectors secured by a first structural rib, the first connector attached to the first structural support connector and the second connector attached to the second structural support connector to secure the first reinforcement sheet to the second reinforcement sheet in a mounted configuration.

16. A ground reinforcing structure for positioning on a ground surface and containing loose masonry materials, the ground reinforcing structure comprising:
a first reinforcement sheet having a first plurality of structural support rows and first flexible links attaching the first plurality of structural support rows, the first plurality of structural support rows including a first support row and a second support row, the first and second support rows extending in and defining a lateral direction, the first support row defining a first structural height and the second support row defining a second structural height, the first flexible links defining a first link height, the first structural height being at least four times greater than the first link height and the second structural height being at least four times greater than the first link height, the first support row defining a first inner end and the second support row defining a second inner end, the first and second inner ends defining an overlap distance measured substantially parallel to the longitudinal direction.

17. The ground reinforcing structure of claim 16, wherein the overlap distance is approximately one-eighth to one-quarter of an inch (⅛-¼").

18. The ground reinforcing structure of claim 16, wherein the first support row includes a first plurality of central supports and a first plurality of pairs of legs, the first plurality of central supports connected by the first plurality of pairs of legs.

19. The ground reinforcing structure of claim 16, wherein the first and second structural heights are approximately three-quarters to one and one-quarter inches (¾-1¼") and the first link height is approximately one-eighth of an inch (⅛").

20. The ground reinforcing structure of claim 16, wherein the second support row includes a second plurality of central supports and a second plurality of pairs of legs, the second plurality of central supports connected by the second plurality of pairs of legs.

21. The ground reinforcing structure of claim 20, wherein the first plurality of pairs of legs defines the first inner end and the second plurality of pairs of legs defines the second inner end.

22. The ground reinforcing structure of claim 20, wherein the first flexible links extend from and are integrally formed with the first plurality of legs and the second plurality of legs.

* * * * *